No. 637,662. Patented Nov. 21, 1899.
J. G. & M. S. PHENIX.
CULINARY STEAMER.
(Application filed May 22, 1899.)
(No Model.) 2 Sheets—Sheet 1.

Witnesses
Jas. K. McCathran
H. J. Bernhard

Josiah G. Phenix
Martha S. Phenix Inventors
By their Attorney
E. G. Siggers

THE NORRIS PETERS CO., PHOTO-LITHO., WASHINGTON, D. C.

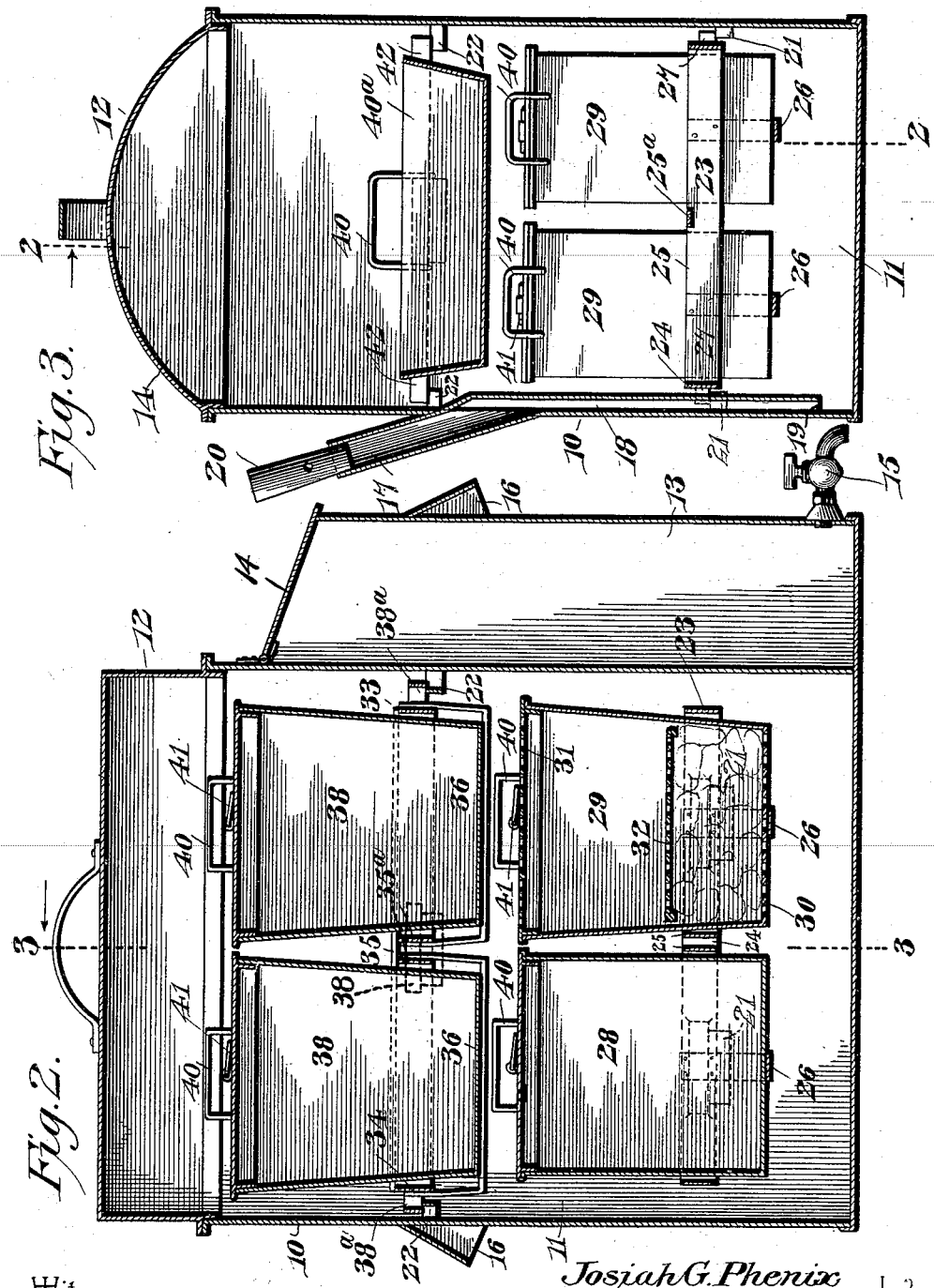

UNITED STATES PATENT OFFICE.

JOSIAH G. PHENIX AND MARTHA STEVENS PHENIX, OF HOODSPORT, WASHINGTON.

CULINARY STEAMER.

SPECIFICATION forming part of Letters Patent No. 637,662, dated November 21, 1899.

Application filed May 22, 1899. Serial No. 717,765. (No model.)

*To all whom it may concern:*

Be it known that we, JOSIAH G. PHENIX, and MARTHA STEVENS PHENIX, citizens of the United States, residing at Hoodsport, in the county of Mason and State of Washington, have invented a new and useful Culinary Steamer, of which the following is a specification.

Our invention relates to improvements in culinary steamers for cooking and warming different kinds of food, and the primary object in view is to provide a simple structure in which the different parts are arranged to permit of the uninterrupted and free circulation of steam throughout the chamber, so that it may obtain access to each and all of the food vessels for quickly and thoroughly steaming, cooking, or warming the food therein without the loss of the flavor and without the escape of odor of the food in one vessel to contaminate the food in other vessels.

A further object of the invention is to provide means for replenishing the water in the steam-chamber at any period in the operation of the cooking, and this water-supply means is equipped with an audible-signal device to be operated by the escaping steam when the water-level in the steaming-chamber drops below the lower end of the water-inlet tube, thus notifying the attendant that the water-supply should be replenished.

A further object of the invention is to provide means whereby a series of food vessels may be disposed compactly within the steamer, each of said vessels adapted to contain one kind of food in a closed chamber in order to retain the odor arising from the food for the purpose of imparting a better flavor to the food and preventing the odor from contaminating the food in other vessels.

With these ends in view the invention consists in the novel combination of elements and in the construction and arrangement of parts, which will be hereinafter fully described and claimed.

To enable others to understand the invention, we have illustrated the preferred embodiment thereof in the accompanying drawings, forming a part of this specification, and in which—

Figure 1:
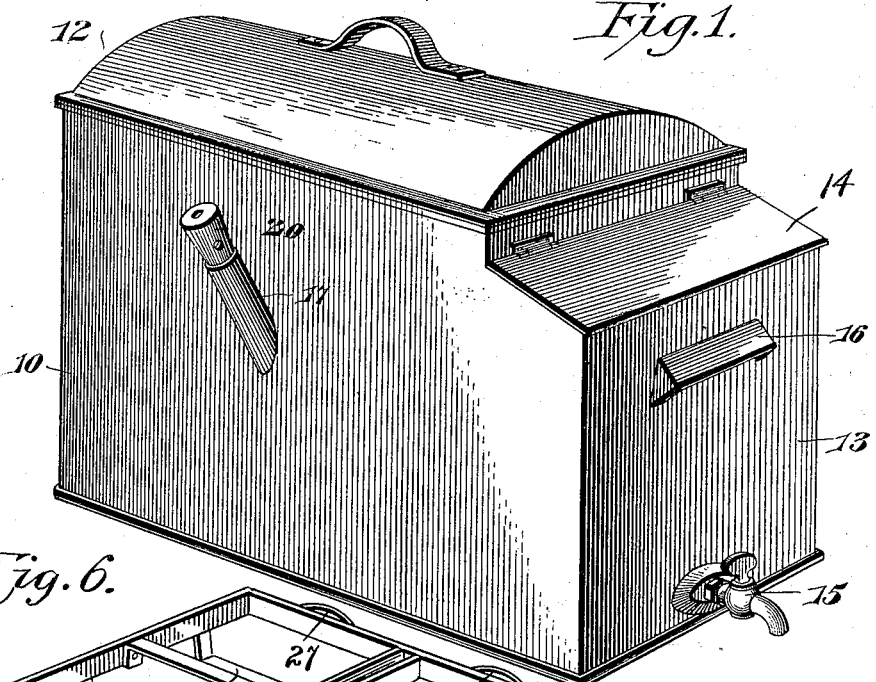
Figure 6:
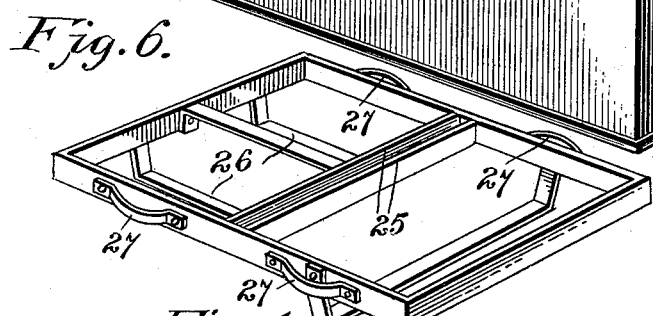
Figure 4:
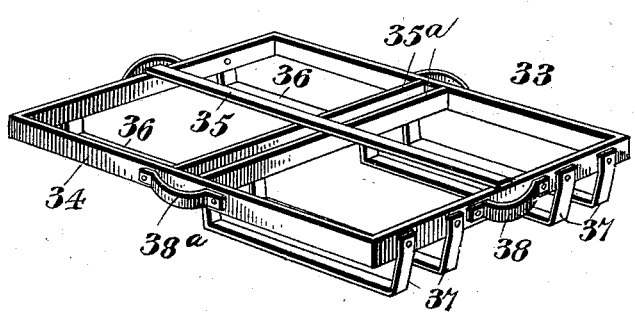
Figure 5:
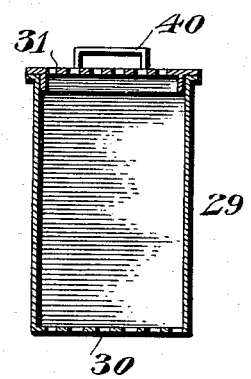

Figure 1 is a perspective view of a culinary steamer embodying our invention. Fig. 2 is a vertical sectional elevation taken longitudinally through the steamer on the plane indicated by the dotted line 2 2 of Fig. 3. Fig. 3 is a vertical transverse section on the plane indicated by the dotted line 3 3 of Fig. 2. Fig. 4 is a detail perspective view of one of the trays. Fig. 5 is a detail sectional view of one of the feed vessels. Fig. 6 is a perspective view of a second tray.

Like numerals of reference denote like and corresponding parts in each of the several figures of the drawings.

The casing or shell 10 of a culinary steamer embodying our invention is preferably of the contour illustrated by Fig. 1, and this casing is constructed of sheet metal in any manner approved by those skilled in the art. The casing has a steaming-chamber 11 of large capacity adapted to contain all or any one of the plurality of food vessels contemplated by our invention, and this steaming-chamber is closed by a removable cover 12, which is adapted to be fitted tightly to the casing 10 in order to confine the steam in the chamber 11. At one end of the steaming-chamber the casing 10 is constructed to provide the water-reservoir 13, which is closed at its upper end by a lid 14, that is hinged to a wall of the casing 10, and this reservoir has a draw-off cock 15 at its lower part for the purpose of drawing water from the reservoir for various culinary or domestic purposes and for replenishing the water-supply in the steaming-chamber 11 with hot water. The reservoir 13 does not have communication with the steaming-chamber 11 of the cooker apparatus, and said reservoir maintains its reserve supply of hot water when the apparatus is in service.

To promote convenience in handling the apparatus, the casing 10 is provided with the handles 16, by which the structure may be placed on or removed from a stove, table, or other surface.

An inclined water-spout 17 is secured firmly to the outside of the casing 10, and the lower end of this water-spout opens through the wall of the casing to which it is fixed, as shown by Fig. 3. Within the chamber 11 of the casing is provided an internal water-tube 18, which is preferably secured to the wall of the casing having the spout 17. This water-tube is fastened in place to communicate at its upper end with the water-spout 17, and the foot of said internal tube 18 terminates above the bottom of the chamber 11, so as to leave an opening or space 19 between the foot of the water-tube and said bottom of the casing. A whistle-tube 20 is fitted removably in the upper end of the water-spout 17, and said tube is provided with or constructed to form a whistle of any suitable pattern which is adapted to be operated by the steam which may escape from the chamber 11.

It is evident that the whistle-tube 20 may be removed from the spout 17 for the attendant to pour water through the tube 17 in order to replenish the supply of water in the chamber 11, after which the whistle-tube should be replaced. A sufficient quantity of water should be poured into the chamber 11 to fill the lower part thereof above the foot of the tube 18, and thereby close the space 19 by water seal, which prevents the escape of steam through the tubes 18 and 17. In pouring the water into the spout it flows into the tube 18, which conducts the water to the bottom part of the chamber 11 without permitting the water to splash when it strikes the bottom of the casing, and it is evident that the water may be supplied to the steaming-chamber at any period in the operation of the apparatus, because the spout 17 is always accessible. When the water becomes evaporated for the level to drop below the foot of the tube 18, the opening 19 is exposed, and the steam which is confined in the chamber 11 is free to escape through the tube 18 and the spout 17 into the whistle-tube 20, thereby operating the whistle to notify the attendant that the supply of water should be replenished.

On the walls of the steaming-chamber 11, above the level of the water which should be contained in said chamber, we provide a series of horizontal ledges or rests 21, which are adapted to sustain the lower tray and its food vessels above the level of the water-bath. These ledges or rests 21 are all arranged in substantially the same horizontal plane, and for the purpose of holding the upper tray and its series of food vessels another series of ledges or rests 22 are provided on the walls of the chamber 11 at a suitable distance above and out of alinement with the lower rests 21, the rests 22, forming the upper series, being all arranged in the same horizontal plane in order that the upper tray may be sustained firmly in place by the upper ledges.

The lower tray 23 is adapted to be fitted removably within the chamber 11 and to rest upon the series of ledges 21. Said lower tray consists of a skeleton frame 24, a transverse metal brace 25, and a series of stirrups 26, all of which parts are united together in a substantial way. The brace 25 extends transversely across the middle part of the skeleton frame 24 to divide the interior thereof into two sections, and one of the sections is subdivided by a transverse brace 25ª, one end of which is secured to the brace 25 and its other end to the frame 24. The stirrups span the openings or pockets provided in the frame, and said stirrups depend from the horizontal plane of the frame in order to properly support the food vessels within the tray. To the outside of the tray-frame 24 is firmly secured the series of lugs 27, which serve to space the tray centrally within the chamber 11 and to rest on the ledges 21 for supporting the tray firmly in place. The exterior dimensions of the tray are smaller than the cross-sectional area of the chamber 11 in order that the tray may readily fit within the chamber in a manner to provide steam-circulating spaces between the walls of the chamber and the food vessels which are supported by the tray, and said tray may be readily removed and replaced without interference from the upper ledges 22 on account of the disalinement of the upper and lower ledges.

The large pocket or compartment of the lower tray is adapted to receive the food vessel 28 of large capacity, while in the smaller compartments of said tray 23 is fitted the removable food vessels 29. The large food vessel 28 has an imperforate bottom and an imperforate removable top, but we prefer to provide the small food vessels 29 with the perforated bottoms 30 and the removable perforated covers 31. Each small perforated vessel is, furthermore, provided with a perforated false bottom 32, which may be slipped into place within the vessel to rest on the food therein. The perforated vessels 29 are especially useful in cooking vegetables, such as potatoes and squash, which require to be cooked in a dry condition, and the employment of the perforations in the bottom of the cover of such vessels enable the steam to circulate, steaming bread and pastry. The perforated false bottoms 32 may be used in either of the perforated vessels 29 in order to divide the chambers therein into two compartments each adapted to contain a different kind of food, and in this event the false bottom 32 may rest on the food that is placed in the lower part of the vessel 29. Of course the false bottom may be dispensed with, if desired.

The upper tray 33 is similar in its general construction to the lower tray 23, and it consists of a skeleton frame 34, the elongated brace 35, and stirrups 36 37. The brace 35 extends the full length of the tray-frame 34 to divide the latter into a series of four pockets, and this longitudinal brace is intersected by the transverse braces 35ª at the middle of the frame. In two of the pockets or compartments of the upper tray we arrange the single stirrups 36, which are disposed on opposite sides of the brace 35. In the remaining compartments of the upper tray are disposed the pairs of stirrups 37, each pair of which lies on opposite sides of the brace 35. The stirrups depend from the horizontal plane of the skeleton frame for the purpose of supporting the upper series of food vessels. The pairs of double stirrups in two of the compartments of this upper tray are advantageous for supporting a teapot or other vessel. This upper tray is smaller than the cross-sectional area of the chamber, and it is provided with the lugs 38, which serve to space said tray within the vessel and also to support the tray on the upper series of ledges 22, whereby the upper tray is supported at a proper distance above the vessels on the lower tray and ample spaces are left between the upper series of vessels, the tray, the walls of the chamber, and the lower series of vessels for the free circulation of steam throughout the chamber 11 and around the two series of vessels and the trays within said chamber. The upper tray carries the series of closed vessels 38, which are fitted individually in the pockets of said tray to rest upon the stirrups thereof, and either of these vessels may be removed from the tray without disturbing the remaining vessels. Each of the vessels is provided with a handle 40 for its convenient manipulation, and the cover to each vessel has a handle 41.

The apparatus is also adapted to accommodate a drip-pan 40ª, which is provided with the lugs 42, adapted to rest on either of the series of lugs 21 or 22; but in Fig. 3 we have represented this drip-pan as resting upon the upper series of lugs or ledges 22, the lugs 42 on said pan serving to space the same relatively to the walls of the chamber 11.

The employment of our steaming apparatus effects a saving of time, labor, and fuel, because the food can be cooked more quickly than in the ordinary way and enough food can be cooked at one time to last several meals. The apparatus requires no attention on the part of the cook, as it is not necessary to stir the food, and the food is more nutritious and wholesome, because none of the juices are dissipated. This is especially advantageous in cooking such foods as vegetables, oysters, meat, and fish, which may be cooked in their own juices and without the addition of water. The employment of the closed vessels prevents the odor from escaping into the food of other vessels or into the room, and by retaining the odor arising from the food within the vessel the food retains its original flavor and the food in the other vessels is not contaminated. The pan 40 may be arranged below the lower series of vessels when cooking meats and fowls in order to catch the grease therefrom; but this pan may also be used for baking purposes. The apparatus is especially serviceable in cooking all kinds of farinaceous foods and also for custards and puddings.

It is our purpose to manufacture the apparatus in different sizes, and, if desired, the cooking vessels may be constructed of earthenware or other suitable materials. The trays, with their vessels, may be used separately or collectively, and any one or more of the vessels may be employed, according to the nature of the food to be cooked.

Changes may be made in the form and proportion of some of the parts, while their essential features are retained and the spirit of the invention embodied. Hence we do not desire to be limited to the precise form of all the parts as shown, reserving the right to vary therefrom.

Having thus described the invention, what we claim is—

1. A portable culinary steamer comprising a flat-sided casing provided with ledges arranged in horizontal series with those of one series out of vertical alinement with those of the other series; and trays of corresponding shape having external lugs which space the tray relatively to the casing, and are arranged correspondingly with the ledges to support the tray thereon, substantially as described.

2. A portable culinary steamer comprising a flat-sided casing provided with ledges arranged in horizontal series with those of one series out of vertical alinement with those of the other series, in combination with trays of corresponding shape having external lugs which space the trays relatively to the casing, and are arranged correspondingly with the ledges to support the trays thereon, and a series of cooking vessels fitted removably to said trays, substantially as described.

3. A portable culinary steamer comprising a flat-sided casing provided with ledges arranged in horizontal series with those of one series out of vertical alinement with those of the other series, in combination with skeleton trays of corresponding shape provided with pendent stirrups, and having external lugs which are arranged correspondingly with their respective ledges to support the trays thereon, and a series of cooking vessels fitted removably to the trays, substantially as described.

4. A portable culinary steamer comprising a casing having straight vertical walls provided with ledges arranged in horizontal series, with the ledges of one series arranged out of vertical alinement with those of the other series, in combination with trays of corresponding shape with the casing and having external lugs which spaces the tray relatively to the walls of the casing, the lugs on one tray being arranged laterally to one side of the lugs on the adjoining tray, and the lugs of each tray corresponding to the location of the respective ledges of the casing, substantially as described.

In testimony that we claim the foregoing as our own we have hereto affixed our signatures in the presence of two witnesses.

JOSIAH G. PHENIX.
MARTHA STEVENS PHENIX.

Witnesses:
W. V. MARTIN,
T. W. RULE.